(12) United States Patent
Jenkins et al.

(10) Patent No.: US 11,779,872 B2
(45) Date of Patent: Oct. 10, 2023

(54) PULSE VALVE

(71) Applicant: MAC Valves, Inc., Wixom, MI (US)

(72) Inventors: Ray Jenkins, Waterford, MI (US);
Matthew Neff, Birmingham, MI (US);
Jeffrey Simmonds, Commerce Township, MI (US); Kevin C. Williams, Wixom, MI (US)

(73) Assignee: MAC Valves, Inc., Wixom, MI (US)

( * ) Notice: Subject to any disclaimer, the term of this patent is extended or adjusted under 35 U.S.C. 154(b) by 357 days.

(21) Appl. No.: 17/021,283

(22) Filed: Sep. 15, 2020

(65) Prior Publication Data

US 2021/0077937 A1   Mar. 18, 2021

Related U.S. Application Data

(60) Provisional application No. 62/902,129, filed on Sep. 18, 2019.

(51) Int. Cl.
| *B01D 46/42* | (2006.01) |
| *B01D 46/71* | (2022.01) |
| *B01D 46/04* | (2006.01) |
| *B01D 46/48* | (2006.01) |
| *F16K 31/124* | (2006.01) |
| *F16K 31/122* | (2006.01) |

(52) U.S. Cl.
CPC ......... *B01D 46/4272* (2013.01); *B01D 46/71* (2022.01); *B01D 46/04* (2013.01); *B01D 46/48* (2013.01); *F16K 31/124* (2013.01); *F16K 31/1221* (2013.01)

(58) Field of Classification Search
CPC .. F16K 31/406; F16K 31/124; F16K 31/1221; Y10T 137/87499
USPC ................................................ 251/63.5, 63.6
See application file for complete search history.

(56) References Cited

U.S. PATENT DOCUMENTS

| 3,384,122 A | 5/1968 | Harpman |
| 4,424,738 A * | 1/1984 | Leighton ............... F16K 17/044 |
| | | 91/509 |
| 5,988,214 A | 11/1999 | Tajima et al. |
| 8,453,678 B2 | 6/2013 | Neff et al. |
| 10,221,868 B2 * | 3/2019 | Matsumoto ............ F15B 11/00 |
| 2004/0007683 A1 * | 1/2004 | Willetts ............... F16K 27/0209 |
| | | 251/63.6 |
| 2007/0044857 A1 | 3/2007 | Rapke et al. |
| 2010/0252132 A1 | 10/2010 | Neff et al. |
| 2013/0105014 A1 | 5/2013 | Brooks et al. |
| 2017/0343020 A1 | 11/2017 | Matsumoto |

(Continued)

FOREIGN PATENT DOCUMENTS

| KR | 101821827 B1 | 1/2018 |
| WO | 2018202670 A1 | 11/2018 |

OTHER PUBLICATIONS

International Search Report and Written Opinion of the International Application No. PCT/US2020/050950 dated Dec. 8, 2020.

(Continued)

*Primary Examiner* — Robert K Arundale
(74) *Attorney, Agent, or Firm* — Harness, Dickey & Pierce, P.L.C.

(57) ABSTRACT

A pulse valve assembly including a main valve and a pilot valve that selectively actuates the main valve.

9 Claims, 12 Drawing Sheets

(56) References Cited

U.S. PATENT DOCUMENTS

2019/0353263 A1* 11/2019 John ............... F16K 31/124
2020/0158255 A1*  5/2020 Neff ............... F16K 31/1245

OTHER PUBLICATIONS

Extended European Search Report for Application No. 20865729.6-1015/4031789 PCT/US2020050950 dated Aug. 1, 2023.

* cited by examiner

PULSE VALVE

CROSS-REFERENCE TO RELATED APPLICATIONS

This application claims the benefit of U.S. Provisional Application No. 62/902,129, filed on Sep. 18, 2019. The entire disclosure of the above application is incorporated herein by reference.

FIELD

The present disclosure relates to pulse valve assemblies, which may be adapted for use in dust collectors or plastic blow molding machines.

BACKGROUND

This section provides background information related to the present disclosure which is not necessarily prior art.

Pulse valve assemblies are commonly used in dust collectors for cleaning purposes. Dust collectors are used in a wide variety of applications to collect environmental dust, saw dust, and other particulates. Typical dust collectors have one or more filter elements that remove and trap dust that is suspended in the fluid flow (e.g., air flow) passing through the dust collector. As a result, the fluid flow exiting the dust collector is substantially free of dust and/or other particulates. Pulse valve assemblies are used in dust collectors to provide a pulse or burst of high velocity fluid flow (e.g., air), which creates a pressure wave that acts on the one or more filter elements of the dust collector to knock or blow dust and/or other particulates off of the filter element. For example, in some systems, the dust collector is configured such that the pulse of air supplied by the pulse valve assembly causes the filter element to rapidly expand and then contract to its initial state. The dust and/or other particulate that has accumulated on or in the filter element falls off the filter element and into a container in the dust collector when this rapid expansion and contraction occurs, cleaning the filter element. This cleaning process can occur while the dust collector remains running. The pulse valve assembly is controlled to provide pulses of air at predetermined intervals to keep the filter element clean.

SUMMARY

This section provides a general summary of the disclosure, and is not a comprehensive disclosure of its full scope or all of its features.

According to a first aspect of the present disclosure, there is provided a pulse valve assembly including a main valve including a main valve body, a main valve bore extending within the main valve body, and a main valve spool slidingly disposed in the main valve bore for movement between a closed position and an open position. The pulse valve assembly also includes a pilot valve configured to selectively move the main valve spool between the closed position and the open position. The main valve body includes an inlet port, an outlet port, a pilot valve inlet passage, a normally closed pilot valve outlet passage, and a normally open pilot valve outlet passage each disposed in fluid communication with the main valve bore. The main valve body has a first pressure chamber at one end of the main valve bore in fluid communication with the normally closed pilot valve outlet passage, and a second pressure chamber at an opposite end of the main valve bore in fluid communication with the normally open pilot valve outlet passage. The main valve spool includes a main valve member configured to block fluid flow between the inlet port and the outlet port when the main valve spool is in the closed position and permit fluid flow from the inlet port to the outlet port when the main valve spool is in the open position. The pilot valve is configured such that in a closed position of the pilot valve, fluid communication is permitted between the pilot valve inlet passage and the normally open pilot valve outlet passage, which pressurizes the second pressure chamber to maintain the main valve spool in the closed position to prevent fluid flow from the inlet port to the outlet port. The pilot valve is configured such that in an open position of the pilot valve, fluid communication is not permitted between the between the pilot valve inlet passage and the normally open pilot valve outlet passage, and is permitted between the pilot valve inlet passage and the normally closed pilot valve outlet passage, which pressurizes the first pressure chamber and depressurizes the second pressure chamber to move the main valve spool to the open positon to permit fluid flow from the inlet port to the outlet port.

Advantageously, this configuration provides a higher-flow valve that has a less tortuous path through the pulse valve, which provides a more efficient pulse valve.

According to a second aspect of the present disclosure, the present disclosure provides a pulse valve assembly including a main valve including a cylindrical main valve body, a main valve bore extending within the main valve body, and a main valve spool slidingly disposed in the main valve bore for movement between a closed position and an open position; and a pilot valve configured to selectively move the main valve spool between the closed position and the open position. The main valve body includes a plurality of axially extending and laterally spaced apart inlet ports located about a circumference of the cylindrical main valve body, an outlet port located radially inward from the plurality of inlet ports, a pilot valve inlet passage, a normally closed pilot valve outlet passage, and a normally open pilot valve outlet passage each disposed in fluid communication with the main valve bore. The main valve body has a first pressure chamber at one end of the main valve bore in fluid communication with the inlet ports and the outlet port, and a second pressure chamber at an opposite end of the main valve bore in fluid communication with the normally open pilot valve outlet passage. The main valve spool includes a main valve member configured to block fluid flow between the inlet ports and the outlet port when the main valve spool is in the closed position and permit fluid flow from the inlet ports to the outlet port when the main valve spool is in the open position. The pilot valve is configured such that in a closed position of the pilot valve, fluid communication is permitted between the pilot valve inlet passage and the normally open pilot valve outlet passage, which pressurizes the second pressure chamber to maintain the main valve spool in the closed position to prevent fluid flow from the inlet port to the outlet port; and the pilot valve is configured such that in an open position of the pilot valve, fluid communication is not permitted between the pilot valve inlet passage and the normally open pilot valve outlet passage, and is permitted between the pilot valve inlet passage and the normally closed pilot valve outlet passage to move the main valve spool to the open positon to permit fluid flow from the inlet ports to the outlet ports.

According to the second aspect, the main valve spool includes a first piston positioned in the second pressure chamber that is configured to block a second pressure chamber outlet that communicates with the first pressure chamber when the main valve spool is in the closed position, and a second piston positioned in the first pressure chamber that seals the outlet port when the mail valve spool is in the closed position, and when the main valve spool is in the open position, fluid is permitted to flow from the second pressure chamber through the second pressure chamber outlet to the first pressure chamber and exit the main valve body through the outlet port.

According to the second aspect, when fluid communication is permitted between the pilot valve inlet passage and the normally closed pilot valve outlet passage to move the main valve spool to the open positon to permit fluid flow from the inlet ports to the outlet ports, the main valve spool is moved in a direction toward the pilot valve to open second pressure chamber outlet.

According to the second aspect, when the main valve spool is in the open position, fluid in the first pressure chamber that is received from the plurality of inlet ports and fluid received from the second pressure chamber outlet port is permitted to exit the outlet.

According to the second aspect, the pulse valve assembly may include a spring positioned about the main valve spool that biases the main valve spool to the closed position.

According to the second aspect, the pilot valve inlet passage communicates with the plurality of inlet ports.

According to the second aspect, the normally open pilot valve outlet passage communicates with the first pressure chamber to maintain the main valve spool in the closed position.

According to the second aspect, the normally open pilot valve outlet passage is in communication with a cavity formed in the main valve body, which communicates with the second pressure chamber via an aperture that separates the cavity and the second pressure chamber.

Lastly, accordingly to the second aspect, the pilot valve includes a pilot valve body defining a pilot valve bore having a pilot valve member located therein, the pilot valve member being actuated by a solenoid that moves the pilot valve member between a first position where fluid communication between the pilot valve inlet passage and the normally open pilot valve outlet is permitted, and a second position where fluid communication between the pilot valve inlet passage and the normally closed pilot valve outlet is permitted.

Advantageously, this configuration provides a higher-flow valve that has a less tortuous path through the pulse valve, which provides a more efficient pulse valve.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
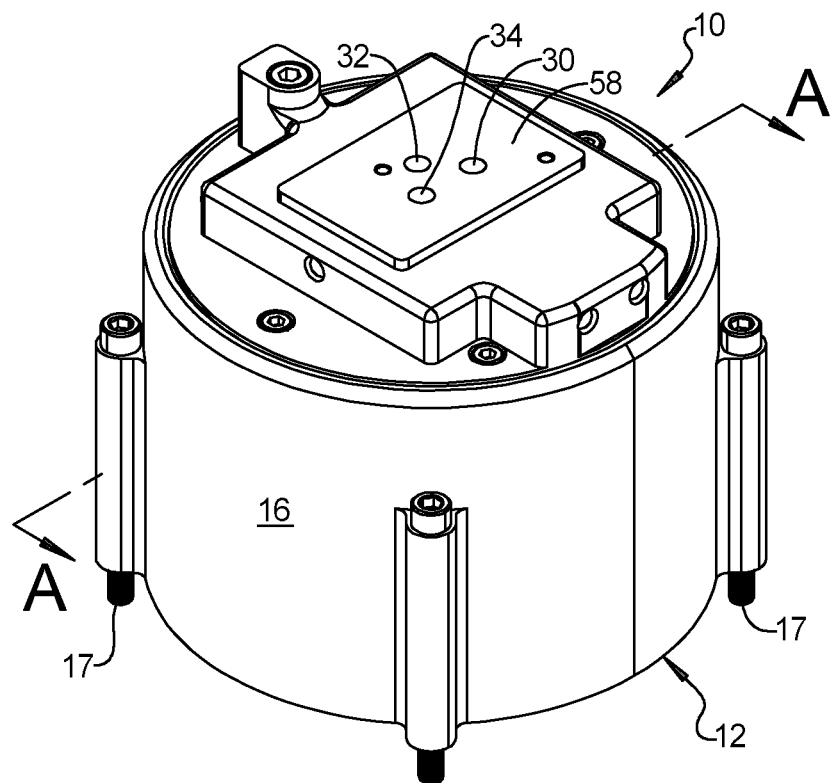
FIG. 1 is a perspective view of a pulse valve assembly according to a principle of the present disclosure.
Figure 2:
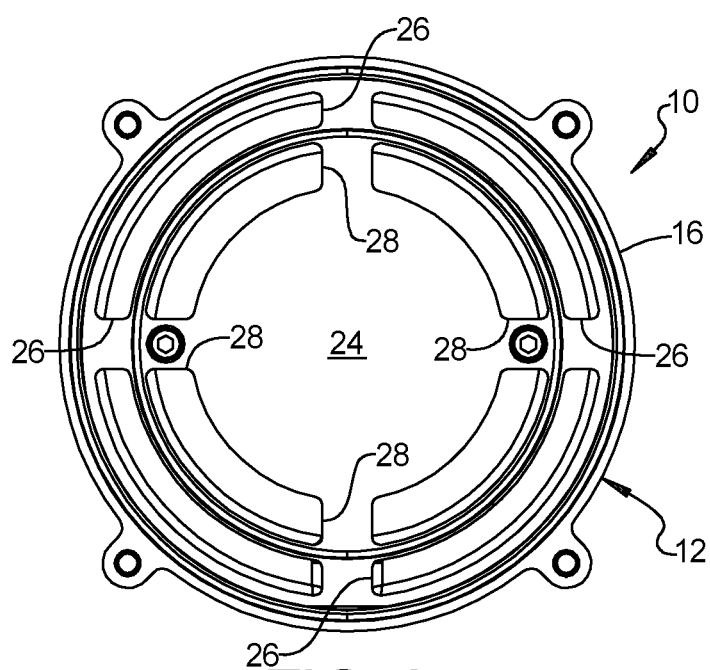
FIG. 2 is a bottom perspective view of the pulse valve assembly illustrated in FIG. 1.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
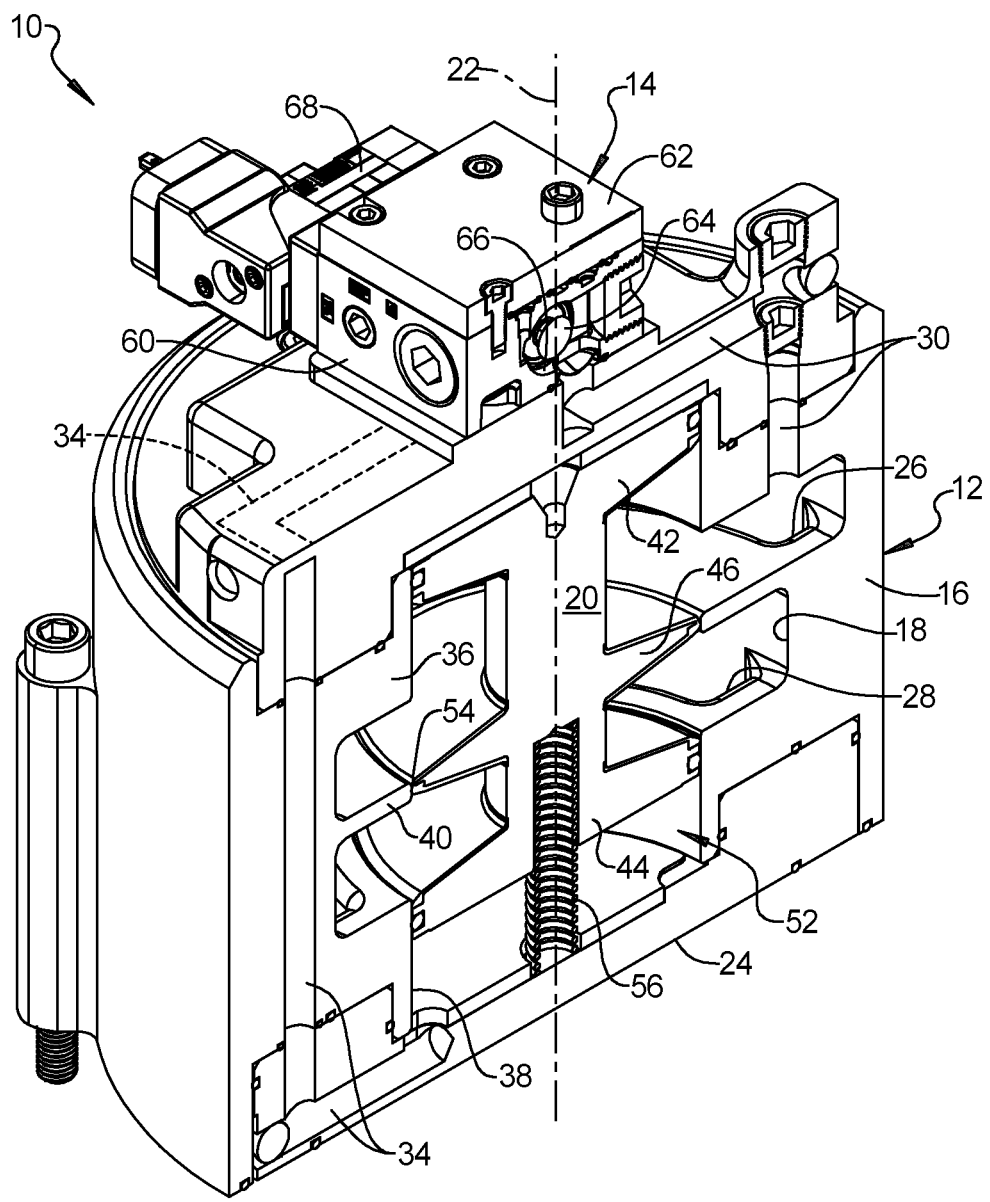
FIGS. 3-6 are perspective cross-sectional views of the pulse valve assembly illustrated in FIG. 1 along line A-A.
Figure 4:
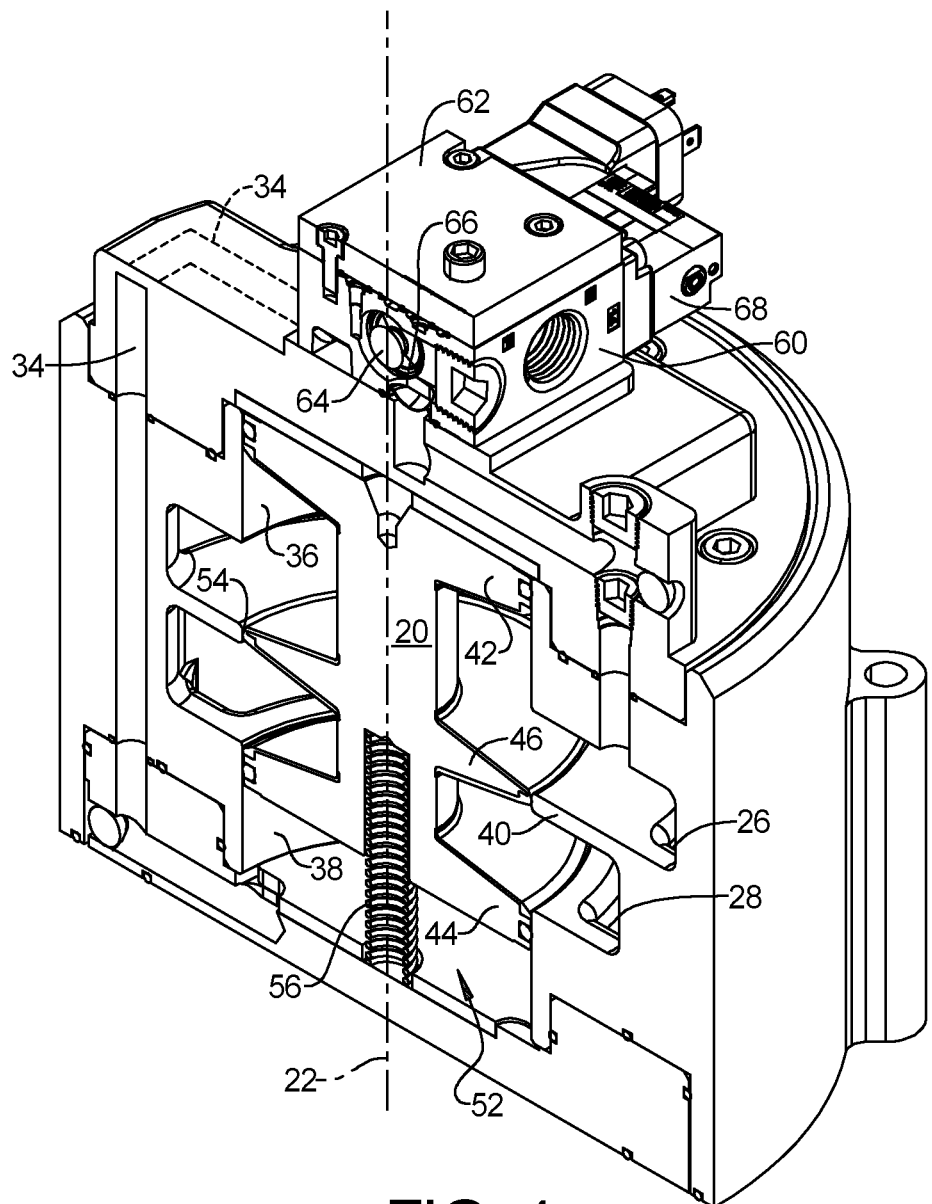
Figure 5:
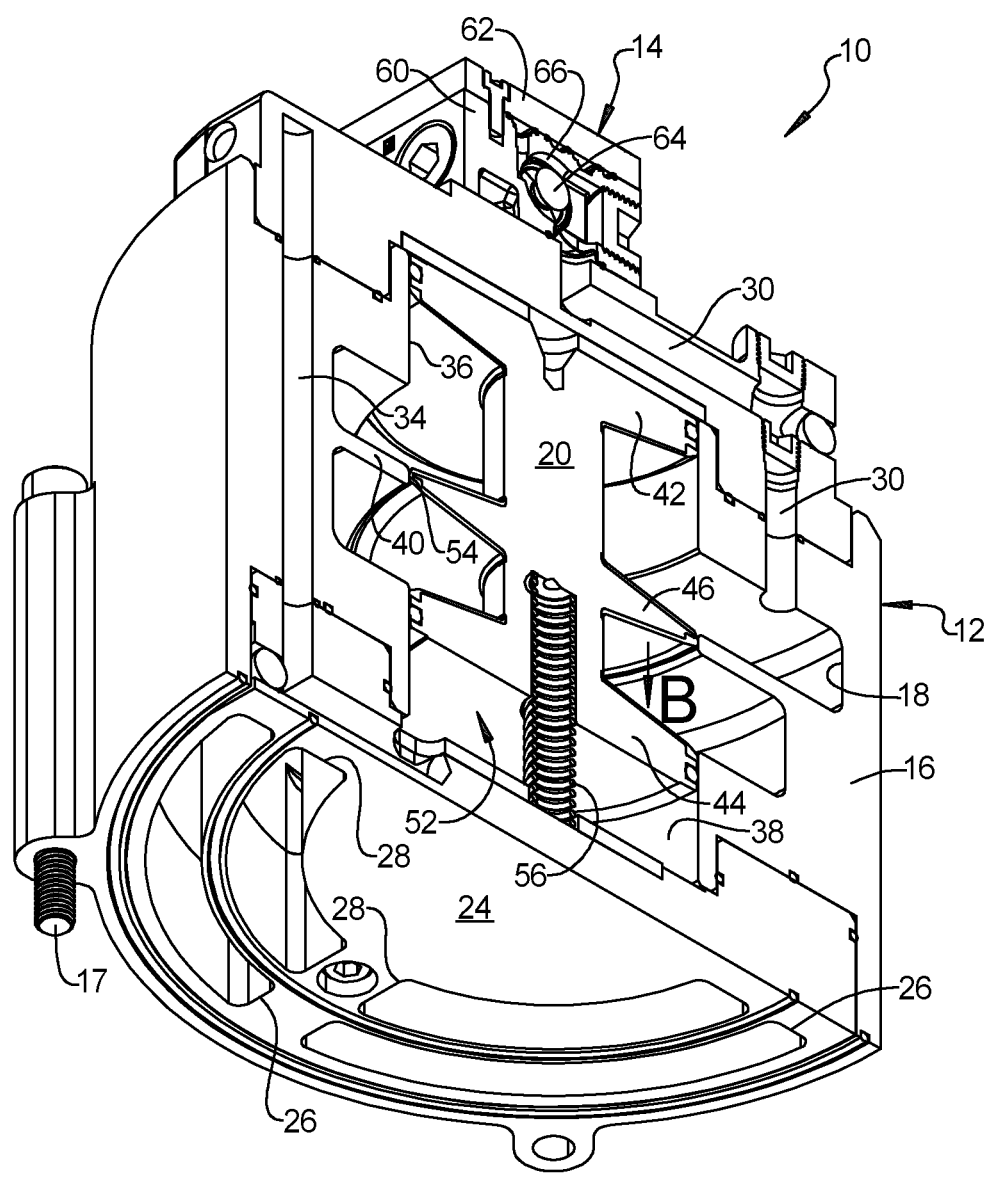
Figure 6:
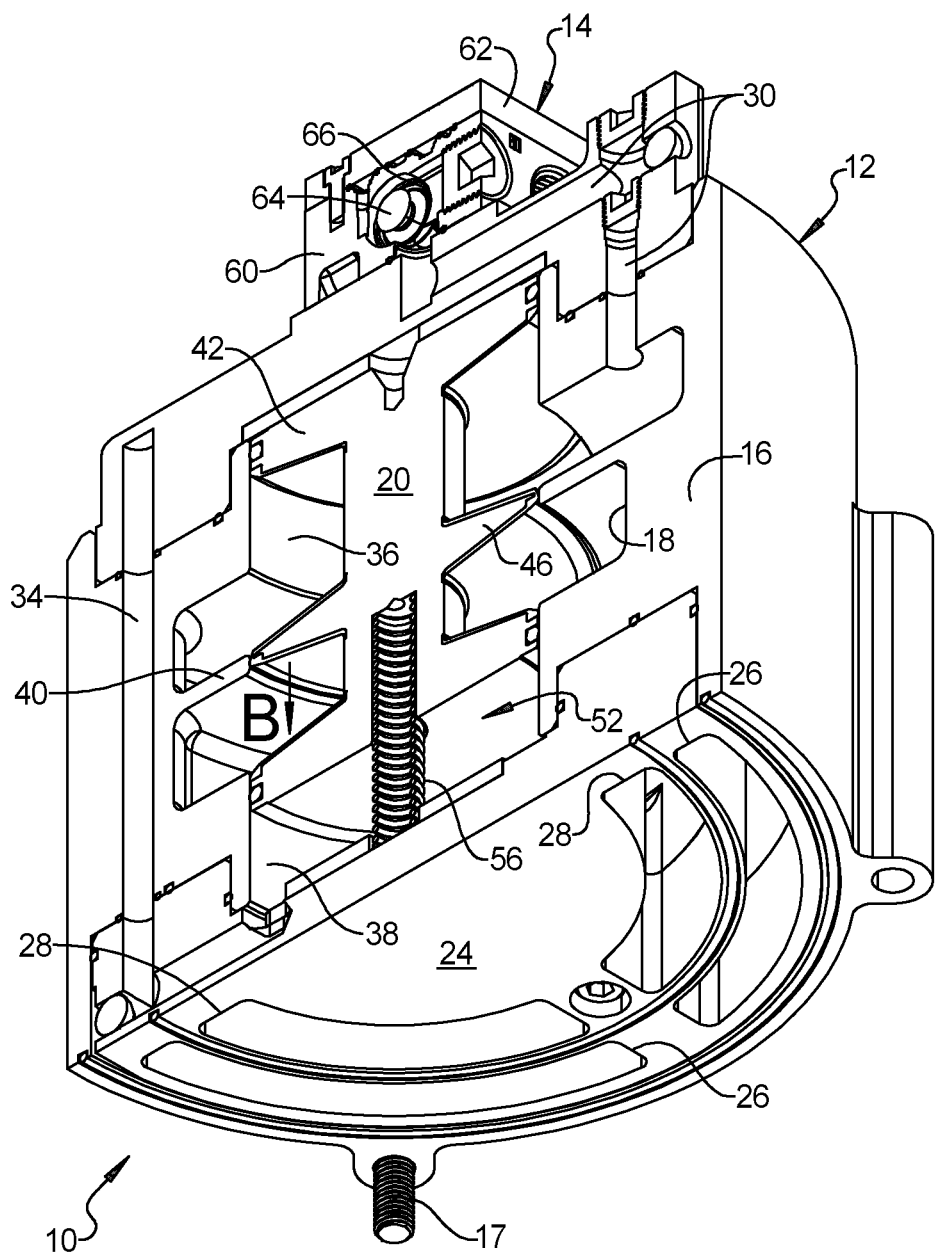
Figure 7:
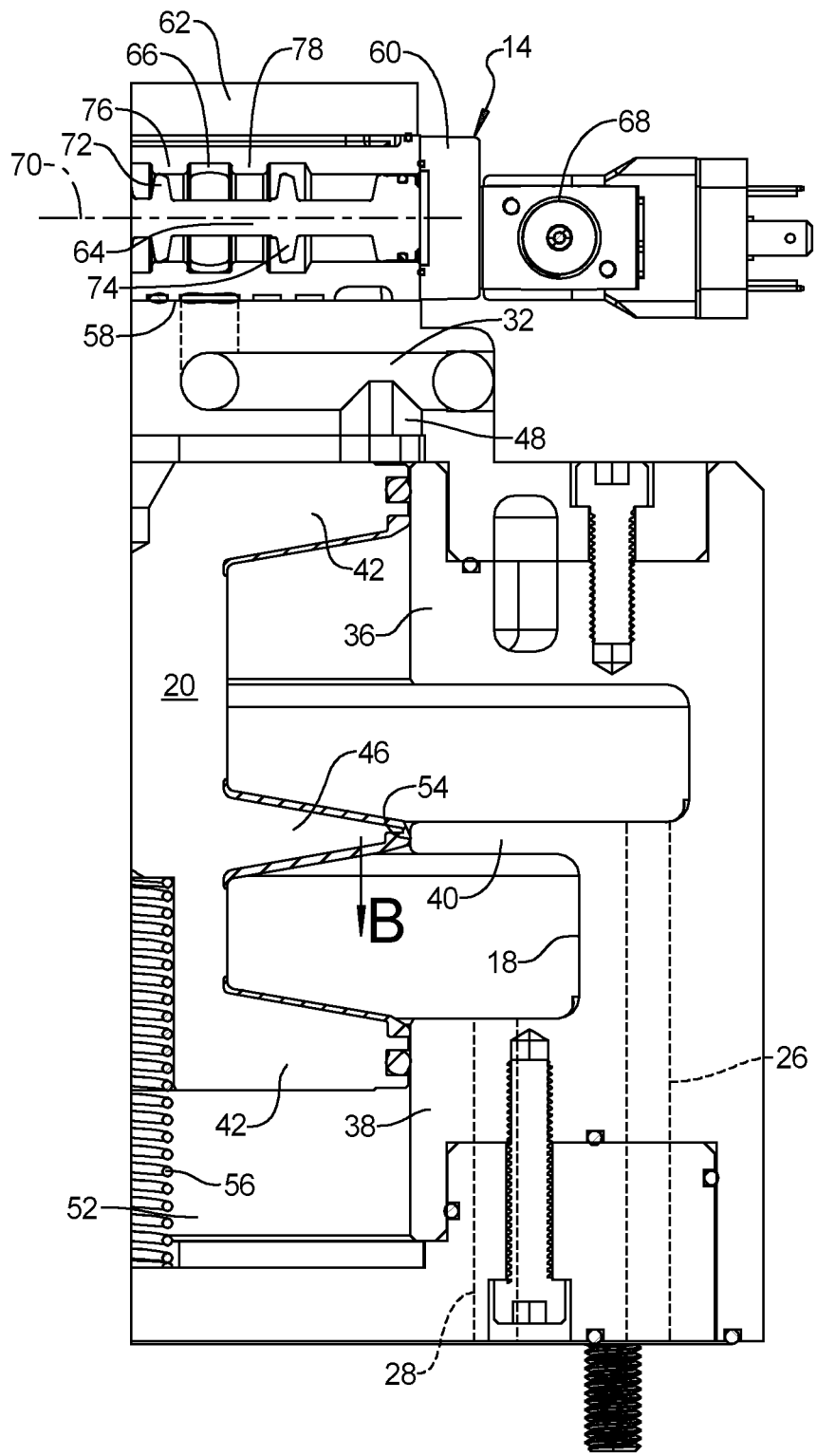
FIG. 7 is a partial cross-sectional view of the pulse valve assembly illustrated in FIG. 1.
Figure 8:
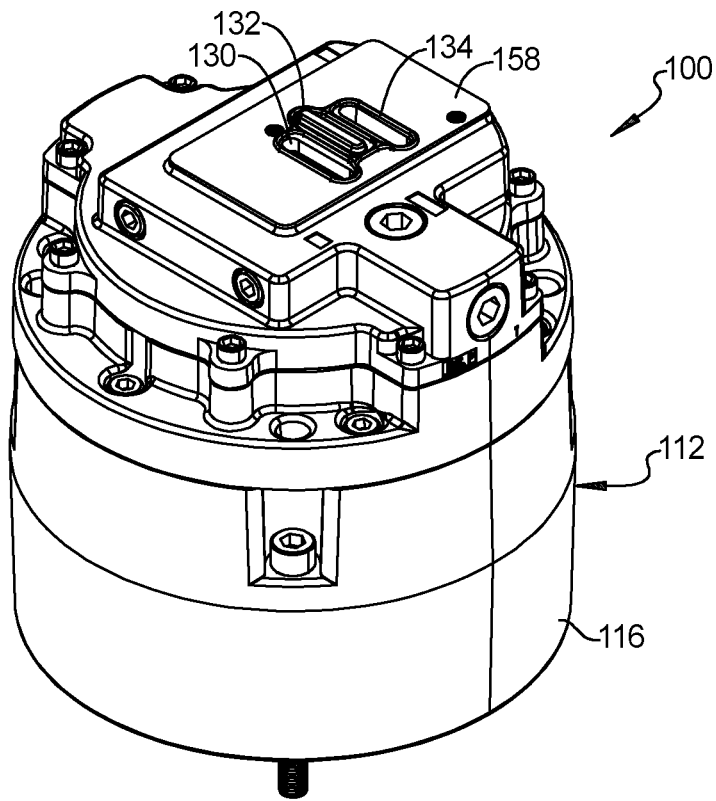
FIG. 8 is a perspective view of a pulse valve assembly according to a principle of the present disclosure.
Figure 9:
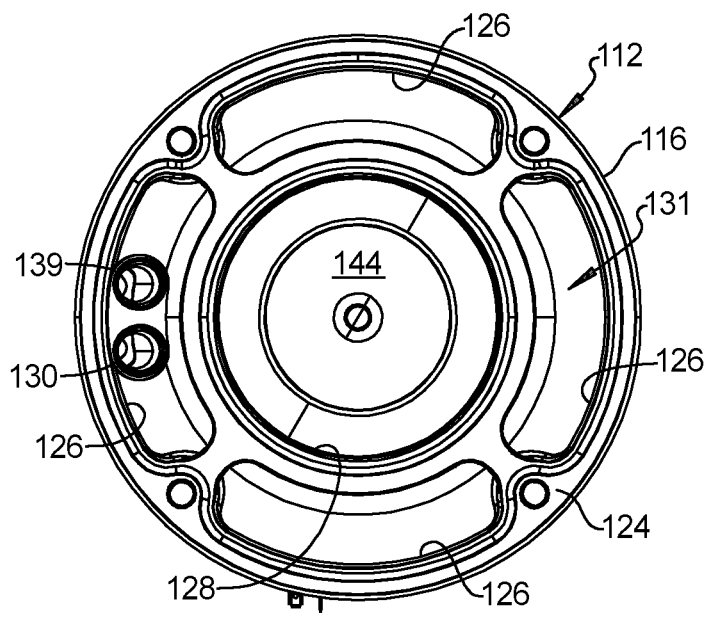
FIG. 9 is a bottom perspective view of the pulse valve assembly illustrated in FIG. 1.
Figure 10:
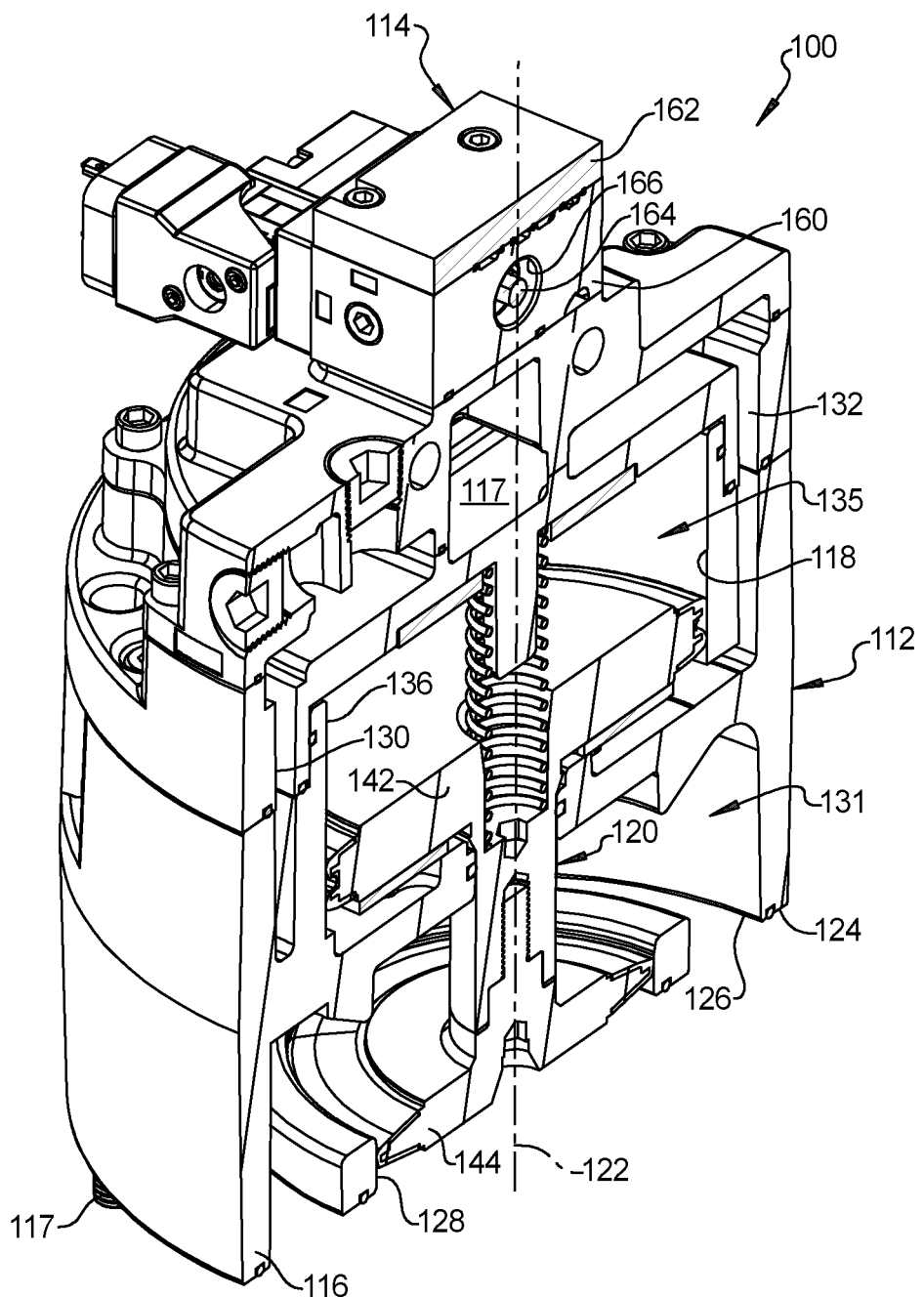
FIGS. 10-13 are perspectives cross-sectional views of the pulse valve assembly illustrated in FIG. 8 along line A-A.
Figure 11:
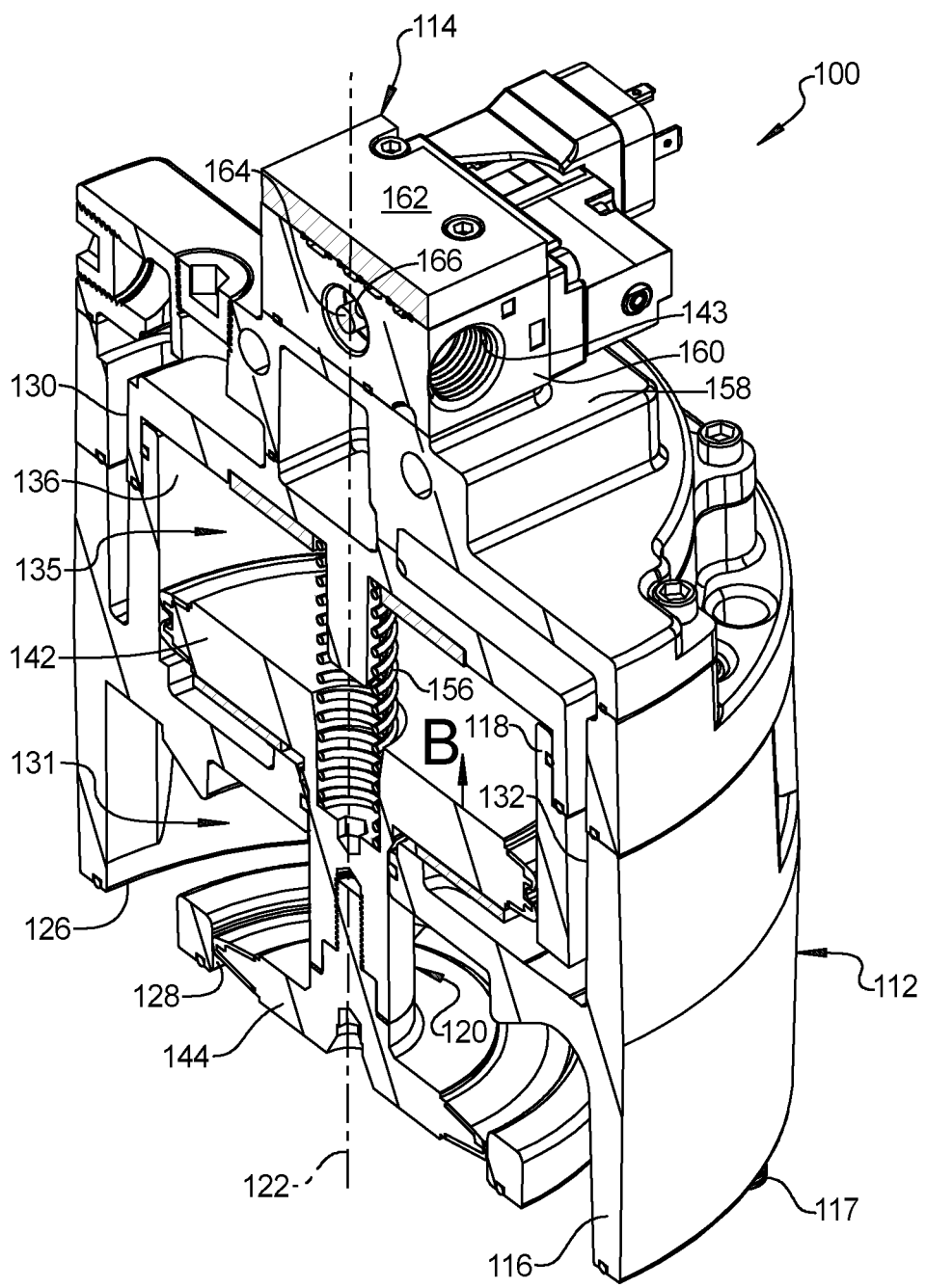
Figure 12:
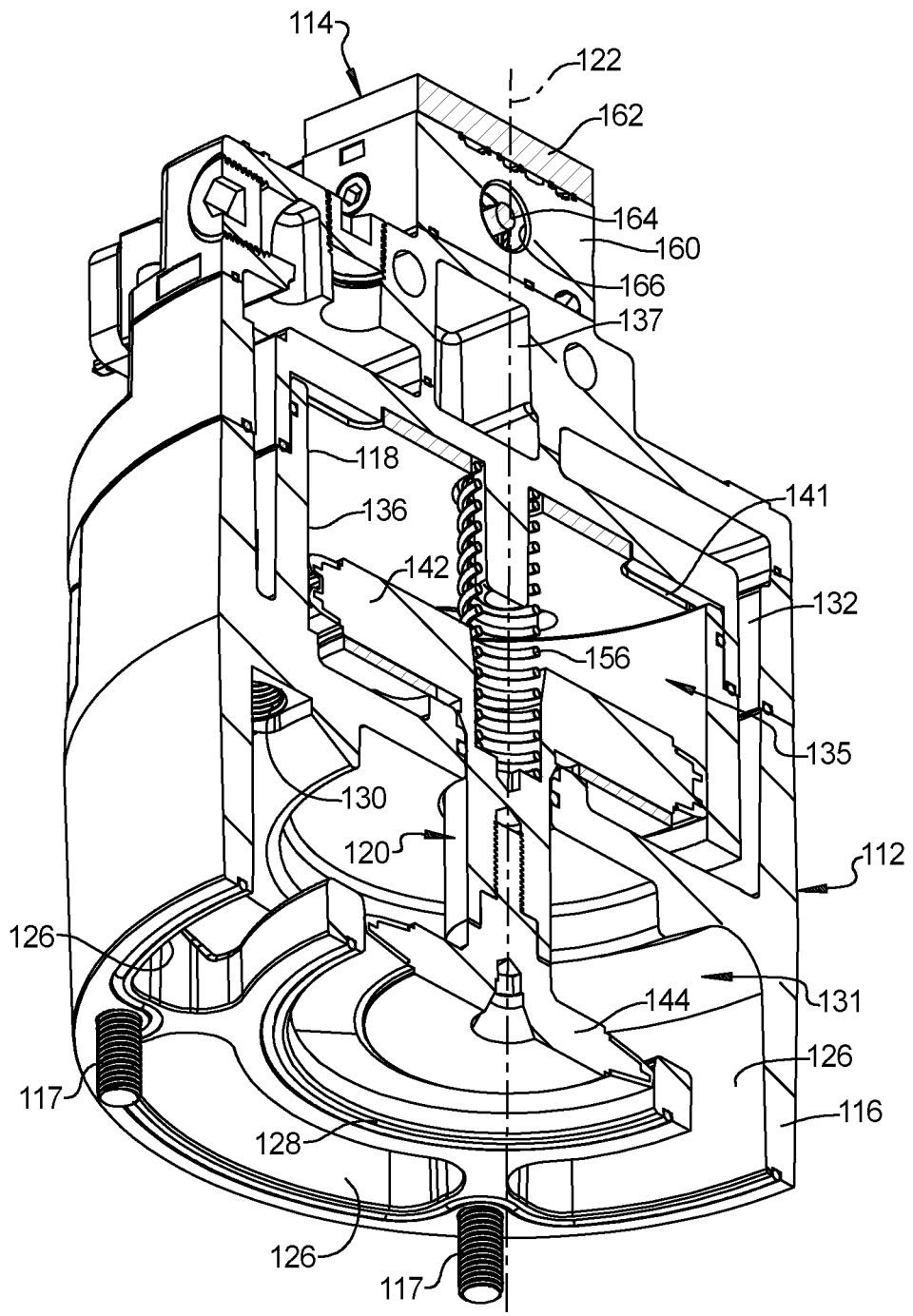
Figure 13:
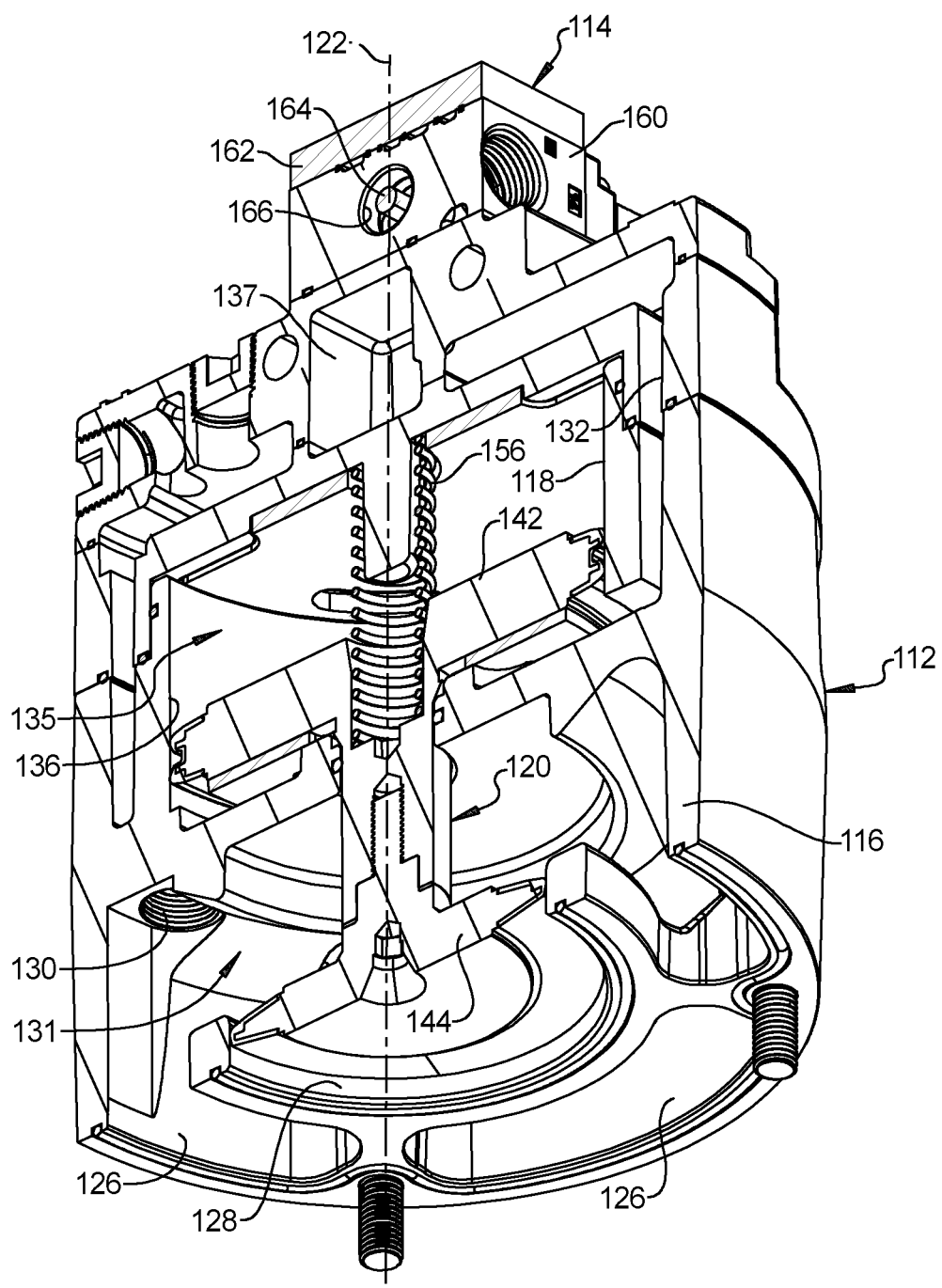

With reference to FIGS. 1-7, a pulse valve assembly 10 according a first embodiment of the present disclosure is illustrated. Pulse valve assembly 10 includes a cylindrical main valve 12 and a pilot valve 14 (show in FIGS. 3-7). The main valve 12 includes a cylindrical main valve body 16, a main valve bore 18, and a main valve spool 20. The main valve bore 18 extends within the main valve body 16 along an axis 22. The main valve spool 20 is disposed in the main valve bore 18 and can move (i.e., slide) within the main valve bore 18 between a closed position (FIGS. 3 and 4) and an open position (FIGS. 5-7, as indicated by the arrow B).

The main valve body 16 has a mounting interface 24 that includes a plurality of axially extending and laterally spaced apart inlet ports 26 and a plurality of axially extending and laterally spaced apart outlet ports 28 located radially inwardly from the plurality of inlet ports 26. The size and number of inlet ports 26 and outlet ports 28, as well as the outlet ports 28 being located radially inwardly from the inlet ports 26 increases the efficiency of the out pulse and flow of the fluid (e.g., air) from the valve assembly 10. In this regard, the size of the inlet and outlet ports 26, 28 provides for an increased volume of fluid (e.g., air) that may be pulsed from the pulse valve 10, while the outlet ports 28 being located radially inwardly from the inlet ports 26 provides for a less tortuous flow path through the pulse valve 10. A base (not illustrated) may optionally be connected to the mounting interface 24 of the main valve body 16 by screws 17. The base provides an input in fluid communication with the inlet ports 26 of the main valve body 16 and is configured to connect to and receive pressurized fluid from a pressurized fluid source (not shown). Examples of pressurized fluid sources include, but are not limited to, storage tanks, pumps, and compressors. The output of the base provides fluid communication with the outlet ports 28 of the main valve body 16 and is configured to connect to and supply pressurized fluid to an accessory device (not shown). Examples of accessory devices include, but are not limited to, nozzles in a dust collector.

The main valve body 16 also includes a pilot inlet passage 30 that communicates with inlet ports 26, a normally closed pilot outlet passage 32 (FIG. 7) that is used to actuate spool 20 between the closed and open positions, and a normally open pilot outlet passage 34. As fluid (e.g., air) travels from inlet ports 26 to pilot inlet passage 30 while pilot valve 14 is in a closed position, the fluid will bypass normally closed pilot outlet passage 32 and travel into normally open pilot outlet passage 34. The inlet ports 26, outlet ports 28, pilot inlet passage 30, normally closed pilot outlet passage 32, and normally open pilot outlet passage 34 are all disposed in fluid communication with the main valve bore 18.

The main valve bore 18 of the main valve body 16 includes a first piston seat 36, a second piston seat 38, and a main valve member 40. The second piston seat 38 is axially spaced from the first piston seat 36 and the main valve member seat 40 is positioned axially between the first and second piston seats 36, 38 in the main valve body 16. The main valve spool 20 includes a first piston 42, a second piston 44, and a main valve member 46. The second piston 44 is axially spaced from the first piston 42, and the main valve member 46 is positioned axially between the first and second pistons 42, 44. The first piston 42 is disposed in sliding contact with the first piston seat 36 when the main valve spool 20 is in the open and closed positions such that the first piston 42 defines a first pressure chamber 48 (FIG. 7) at one end of the main valve spool 20. The first pressure chamber 48 is disposed in fluid communication with and receives pressurized fluid from the normally closed pilot outlet passage 32. The second piston 44 is disposed in sliding contact with the second piston seat 38 when the main valve spool 20 is in the open and closed positions such that the second piston 44 defines a second pressure chamber 52 at an opposite end of the main valve bore 18. The second pressure chamber 52 is disposed in fluid communication with and receives pressurized fluid from the normally open pilot outlet passage 34.

The main valve member 46 includes an abutment surface 54 that contacts the main valve member seat 40 when the main valve spool 20 is in the closed position (FIGS. 3, 4, and 7). As a result, the main valve member 46 blocks fluid flow between the inlet ports 26 and the outlet ports 28 in the main valve body 16 when the main valve spool 20 is in the closed position. In contrast, the main valve member 46 is axially spaced from the main valve member seat 40 when the main valve spool 20 is in the open position (FIGS. 5 to 7, as shown by the arrow B). As a result, the main valve member 46 permits (i.e., allows) fluid to flow from the inlet ports 26 to the outlet port 28 in the main valve body 16 when the main valve spool 20 is in the open position. Although not required, the main valve 12 includes a main valve spring 56 that is disposed in the second pressure chamber 52 of the main valve bore 18. The main valve spring 56 contacts the second piston 44 to bias the main valve spool 20 towards the closed position (FIGS. 3 and 4). In accordance with this configuration, the main valve 12 acts as a two-way, normally closed valve.

Pilot valve 14 is mounted to a mounting surface 58 of main valve body 16. Pilot valve 14 includes a pilot valve body 60 that is fixed to mounting surface 58, and includes a lid 62 that encloses a solenoid-actuated pilot valve member 64. Pilot valve member 64 is slidable within pilot valve body 60 along a pilot valve bore 66 to open and close normally closed pilot outlet passage 32. Pilot valve bore 66 communicates with pilot inlet passage 30 and normally open pilot outlet passage 34 such that, as described above, fluid (e.g., air) flows from inlet ports 26 into pilot inlet passage 30, from pilot inlet passage 30 into pilot valve bore 66, and into normally open pilot outlet passage 34 when pilot valve member 64 is in the closed position. Upon actuation of pilot valve member 64 by a solenoid 68, the fluid (e.g., air) is then free to flow from pilot valve bore 66 into normally closed pilot outlet passage 32 to actuate main valve spool 20 into the open position (FIGS. 5 and 6). Pilot valve 14 may be a pilot valve described in U.S. Ser. No. 16/196,318 assigned to MAC Valves, Inc., which is also the assignee of the present disclosure. The disclosure of U.S. Ser. No. 16/196,318 is hereby incorporated by reference in its entirety. Alternatively, pilot valve 14 may be any other type of pilot valve known to one skilled in the art.

As best seen in FIG. 7, the pilot valve bore 66 extends within the pilot valve body 60 along a transverse axis 70 that is perpendicular to the axis 22 of the main valve bore 18. As described above, pilot valve member 64 is disposed in the pilot valve bore 66 and can move (i.e., slide) inside the pilot valve bore 66 along the transverse axis 70. However, it should be appreciated that other configurations are possible where pilot valve 14 is installed at a different location and/or orientation relative to the main valve 12.

Pilot valve 14 includes solenoid 68 for driving the pilot valve member 64 inside pilot valve bore 66 between two or more axially spaced positions. As a result, the position of the pilot valve member 64 in pilot valve bore 66 determines whether or not the pressurized fluid can flow from the pilot inlet passage 30 to the normally closed pilot outlet passage 32.

Pilot valve member 64 includes a first valve head 72 and a second valve head 74 longitudinally spaced apart from the first valve head 72. In a closed position of pilot valve 14 (i.e., when normally closed pilot outlet passage 32 is prevented from receiving pressurized fluid), first valve head 72 is in contact with a first valve seat 76 of pilot valve bore 66, and second valve head 74 is longitudinally spaced apart from a second valve seat 78 of pilot valve bore 66. In this state, pressurized fluid is free to enter pilot valve 14 through pilot valve inlet passage 30 and exit pilot valve 14 (not shown) into normally open pilot valve outlet passage 34. In this manner, the pressurized fluid is able to enter second pressure chamber 52 via normally open pilot valve outlet passage 34 to force spool 20 into the closed position where main valve member 46 is in engagement with main valve bore surface 40.

In an open position of pilot valve 14 (i.e., when normally closed pilot outlet passage 32 is permitted to receive pressurized fluid), solenoid 68 is energized to force pilot valve member 64 in a direction away from solenoid 68, which moves first valve head 72 away from first valve seat 76 and moves second valve head 74 into contact with second valve seat 78 of pilot valve bore 66. In this state, pressurized fluid is free to enter pilot valve 14 through pilot valve inlet passage 30 and exit pilot valve 14 into normally closed pilot outlet passage 32, without entering normally open pilot valve outlet passage 34. In this manner, the pressurized fluid is prevented from reaching second pressure chamber 52 while being able to enter first pressure chamber 48. Because no pressurized fluid is in second pressure chamber 52 (or at least because the fluid in second pressure chamber 52 is no longer pressurized), the pressurized fluid in first pressure chamber 48 is sufficient to force main valve spool 20 in a direction away (i.e., in the direction of arrow B) from pilot valve 14 such that main valve member 46 is disengaged from main valve member seat 40. Thus, the pressurized fluid that enters inlet ports 26 is able to flow from inlet ports 26 into main valve bore 18 and around main valve member seat 40 into outlet ports 28.

The above-described pulse valve 10 provides a higher-flow valve that has a less tortuous path through the pulse valve 10, which provides a more efficient pulse valve 10. In this regard, the size and number of inlet ports 26 and outlet ports 28, as well as the outlet ports 28 being located radially inwardly from the inlet ports 26 increases the efficiency of the out pulse and flow of the fluid (e.g., air) from the valve assembly 10. More particularly, the size of the inlet and outlet ports 26, 28 provides for an increased volume of fluid (e.g., air) that may be pulsed from the pulse valve 10, while the outlet ports 28 being located radially inwardly from the inlet ports 26 provides for a less tortuous flow path through the pulse valve 10.

Now referring to FIGS. 8-14, a second embodiment of the present disclosure will be described. Pulse valve assembly 100 includes a cylindrical main valve 112 and a pilot valve 114 (FIGS. 10-14). The main valve 112 includes a cylindrical main valve body 116, a main valve bore 118, and a main valve spool 120. The main valve bore 118 extends within the main valve body 116 along an axis 122. The main valve spool 120 is disposed in the main valve bore 118 and can move (i.e., slide) within the main valve bore 118 between a closed position and an open position (as indicated by the arrow B).

The main valve body 116 has a mounting interface 124 that includes a plurality of axially extending and laterally spaced apart inlet ports 126 and a single outlet port 128 located at a center of the mounting interface 124 that is located radially inwardly from the plurality of inlet ports 126. The size and number of inlet ports 126 and the outlet port 128, as well as the outlet port 128 being located radially inwardly from the inlet ports 126 increases the efficiency of the out pulse and flow of the fluid (e.g., air) from the valve assembly 100. In this regard, the size of the inlet ports 126 and the outlet port 128 provides for an increased volume of fluid (e.g., air) that may be pulsed from the pulse valve 100 while the outlet port 128 being located radially inwardly from the inlet ports 126 provides for a less tortuous flow path through the pulse valve 100. A base (not illustrated) may optionally be connected to the mounting interface 124 of the main valve body 116 by screws 117. The base provides an input in fluid communication with the inlet ports 126 of the main valve body 116 and is configured to connect to and receive pressurized fluid from a pressurized fluid source (not shown). Examples of pressurized fluid sources include, but are not limited to, storage tanks, pumps, and compressors. The output of the base provides fluid communication with the outlet port 128 of the main valve body 116 and is configured to connect to and supply pressurized fluid to an accessory device (not shown). Examples of accessory devices include, but are not limited to, nozzles in a dust collector.

The main valve body 116 includes a pilot inlet passage 130 that communicates with inlet ports 126. In this regard, as the fluid (e.g., air) enters each of the inlet ports 126, the fluid will collect in a first chamber 131 that surrounds main valve spool 120 before entering pilot inlet passage 130 and travelling to pilot valve 114. Main valve body 116 also includes normally closed pilot outlet passage 132 (FIGS. 10-14) that is used to actuate main valve spool 120 between the closed and open positions, and a normally open pilot outlet passage 134. As fluid (e.g., air) travels from inlet ports 126 to pilot inlet passage 130 while pilot valve 114 is in a closed position, the fluid will bypass normally closed pilot outlet passage 132 and travel into normally open pilot outlet passage 134 to pressurize a second chamber 135 via a cavity 137 that communicates with normally open pilot outlet passage 134 via apertures 141 formed in main valve body 116, which keeps main valve spool 120 in the closed position. The inlet ports 126, outlet port 128, pilot inlet passage 130, normally closed pilot outlet passage 132, and normally open pilot outlet passage 134 are all disposed in fluid communication with the main valve bore 118. Any excessive pressure that builds in cavity 137 and second pressure chamber 135 may be relieved through a bleed passage 143 formed in pilot valve 114.

The main valve bore 118 of the main valve body 116 includes a first piston seat 136 in second chamber 135 and a second piston seat 138 in first chamber 131. The second piston seat 138 is axially spaced from the first piston seat 136. The main valve spool 120 includes a first piston 142 and a second piston 144. The second piston 144 is axially spaced from the first piston 142. The first piston 142 is disposed in sliding contact with the first piston seat 136 when the main valve spool 120 is in the open and closed positions.

The second pressure chamber 135, in addition to being in fluid communication with normally open pilot outlet passage 134, is also in fluid communication with and receives pressurized fluid from the normally closed pilot outlet passage 132 when pilot valve 114 is in the open position, which actuates main valve spool 120 to move first piston 142 in a direction toward pilot valve 114 to open the valve 100. The second piston 144 is disposed in sliding contact with the second piston seat 138, and is used to seal and open outlet port 128. The first pressure chamber 131, in addition to being in communication with fluid inlet ports 126, is also in communication with second pressure chamber 135 via a second pressure chamber outlet 139 (FIG. 14) such that when valve spool 120 moves to the open position, each of first piston 142 and second piston 144 are moved in the direction of the arrow B to permit fluid communication between second chamber 135 and first chamber 131, and allow the fluid to exit the valve 100 through outlet port 128. A valve spring 156 may be positioned about valve spool 120 in the second pressure chamber 135 of the main valve bore 118. The valve spring 156 contacts the first piston 142 to bias the main valve spool 120 towards the closed position. In accordance with this configuration, the valve 100 acts as a two-way, normally closed valve.

Pilot valve 114 is mounted to a mounting surface 158 of main valve body 116. Pilot valve 114 includes a pilot valve body 160 that is fixed to mounting surface 158, and includes a lid 162 that encloses a solenoid-actuated pilot valve member 164. Pilot valve member 164 is slidable within pilot valve body 160 along a pilot valve bore 166 to open and close normally closed pilot outlet passage 132. Pilot valve bore 166 communicates with pilot inlet passage 130 and normally open pilot outlet passage 134 such that, as described above, fluid (e.g., air) flows from inlet ports 126 into pilot inlet passage 130, from pilot inlet passage 130 into pilot valve bore 166, and into normally open pilot outlet passage 134 when pilot valve member 164 is in the closed position. Upon actuation of pilot valve member 164 by a solenoid 168, the fluid (e.g., air) is then free to flow from pilot valve bore 166 into normally closed pilot outlet passage 132 to actuate main valve spool 120 into the open position (FIGS. 5 and 6). Pilot valve 114 may be a pilot valve described in U.S. Ser. No. 16/196,318 assigned to MAC Valves, Inc., which is also the assignee of the present disclosure. The disclosure of U.S. Ser. No. 16/196,318 is hereby incorporated by reference in its entirety. Alternatively, pilot valve 114 may be any other type of pilot valve known to one skilled in the art.

Figure 14:
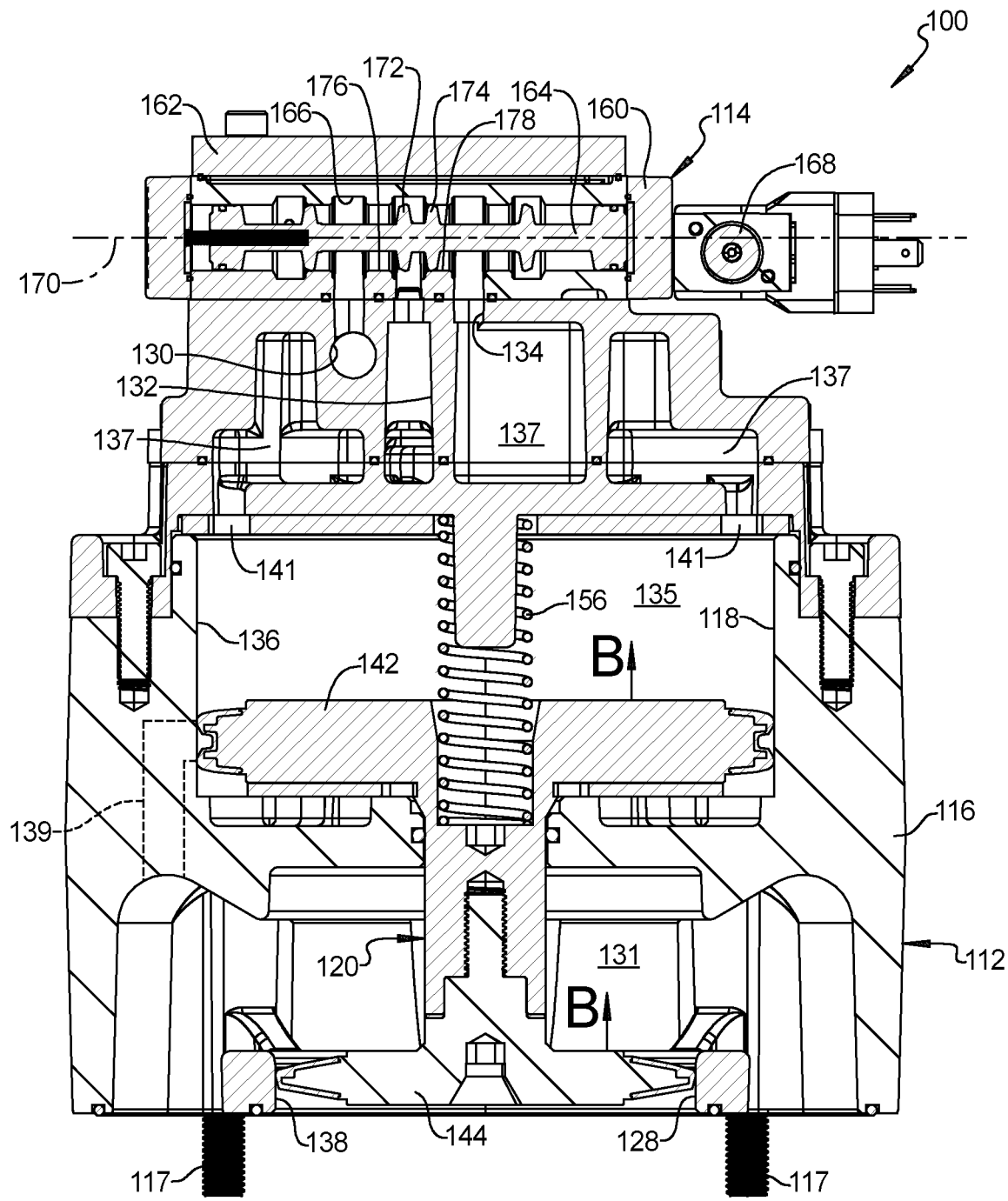
FIG. 14 is a cross-sectional view of the pulse valve assembly illustrated in FIG. 8 along line B-B.

As best seen in FIG. 14, the pilot valve bore 166 extends within the pilot valve body 160 along a transverse axis 170 that is perpendicular to the axis 122 of the main valve bore 118. As described above, pilot valve member 164 is disposed in the pilot valve bore 166 and can move (i.e., slide) inside the pilot valve bore 166 along the transverse axis 170. However, it should be appreciated that other configurations are possible where pilot valve 114 is installed at a different location and/or orientation relative to the main valve 112.

Pilot valve 114 includes solenoid 168 for driving the pilot valve member 164 inside pilot valve bore 166 between two or more axially spaced positions. As a result, the position of the pilot valve member 164 in pilot valve bore 166 determines whether or not the pressurized fluid can flow from the pilot inlet passage 130 to the normally closed pilot outlet passage 132.

Pilot valve member 164 includes a first valve head 172 and a second valve head 174 longitudinally spaced apart from the first valve head 172. In a closed position of pilot valve 114 (i.e., when normally closed pilot outlet passage 132 is prevented from receiving pressurized fluid), first valve head 172 is in contact with a first valve seat 176 of pilot valve bore 166, and second valve head 174 is longitudinally spaced apart from a second valve seat 178 of pilot valve bore 166. In this state, pressurized fluid is free to enter pilot valve 114 through pilot valve inlet passage 130 and exit pilot valve 114 (not shown) into normally open pilot valve outlet passage 134. In this manner, the pressurized fluid is able to enter second pressure chamber 135 via normally open pilot valve outlet passage 134 via cavity 137 to force spool 120 into the closed position where first piston 142 is in engagement with first valve seat 136 of main valve bore 118.

In an open position of pilot valve 114 (i.e., when normally closed pilot outlet passage 132 is permitted to receive pressurized fluid as shown in FIG. 14), solenoid 168 is energized to force pilot valve member 164 in a direction toward solenoid 168, which moves first valve head 172 away from first valve seat 176 and moves second valve head 174 into contact with second valve seat 178 of pilot valve bore 166. In this state, pressurized fluid is free to enter pilot valve 114 through pilot valve inlet passage 130 and exit pilot valve 114 into normally closed pilot outlet passage 132, without entering normally open pilot valve outlet passage 134. As the fluid enters normally closed pilot outlet passage 132, pressure will increase in normally closed outlet passage 132 to an extent that first and second pistons 142 and 144 are moved in the direction of arrow B. When first piston 142 is moved in the direction of arrow B, the fluid is permitted to enter second pressure chamber 135 and the second pressure chamber outlet 139 is opened. Thus, the fluid that has entered second pressure chamber 135 will be permitted to flow into first pressure chamber 131. Further, because second piston 144 is also moved in the direction of arrow B to open outlet port 128, the pressurized fluid that entered first pressure chamber 131 from second pressure chamber 135 via second pressure chamber outlet 139 is permitted to exit the valve 100 through the open outlet port 128. In addition, it should be noted that inlet ports 126 will continue to receive fluid that upon entry into first pressure chamber 131 will also be permitted to exit outlet port 128. In this manner, an increased pulse of fluid can be emitted by valve 100 when valve 100 is in the open state.

The above-described pulse valve 100 provides a higher-flow valve that has a less tortuous path through the pulse valve 100, which provides a more efficient pulse valve 100. In this regard, as noted above, the amount of fluid that is emitted from valve 100 will include the amount of fluid that is required to actuate main valve spool 120 to the open position as well as the fluid that continues to enter the valve 100 through inlet ports 126.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pulse valve assembly comprising: a main valve including a cylindrical main valve body, a main valve bore extending along an axis within the main valve body, and a main valve spool slidingly disposed along the axis in the main valve bore for movement between a closed position and an open position; and a pilot valve configured to selectively move the main valve spool between the closed position and the open position, wherein the main valve body includes a plurality of laterally spaced apart inlet ports extending along the axis and located about a circumference of the cylindrical main valve body, an outlet port located radially inward from the plurality of inlet ports, a pilot valve inlet passage, a normally closed pilot valve outlet passage, and a normally open pilot valve outlet passage each disposed in fluid communication with the main valve bore; the main valve body has a first pressure chamber at one end of the main valve bore in fluid communication with the inlet ports and the outlet port, and a second pressure chamber at an opposite end of the main valve bore in fluid communication with the normally open pilot valve outlet passage; the main valve spool includes a main valve member configured to block fluid flow between the inlet ports and the outlet port when the main valve spool is in the closed position and permit fluid flow from the inlet ports to the outlet port when the main valve spool is in the open position; the pilot valve is configured such that in a closed position of the pilot valve, fluid communication is permitted between the pilot valve inlet passage and the normally open pilot valve outlet passage, which pressurizes the second pressure chamber to maintain the main valve spool in the closed position to prevent fluid flow from the inlet port to the outlet port; and the pilot valve is configured such that in an open position of the pilot valve, fluid communication is not permitted between the pilot valve inlet passage and the normally open pilot valve outlet passage, and is permitted between the pilot valve inlet passage and the normally closed pilot valve outlet passage to move the main valve spool to the open position to permit fluid flow from the inlet ports to the outlet port.

2. The pulse valve assembly according to claim 1, wherein the main valve spool includes a first piston positioned in the second pressure chamber that is configured to block a second pressure chamber outlet that communicates with the first pressure chamber when the main valve spool is in the closed position, and a second piston positioned in the first pressure chamber that seals the outlet port when the main valve spool is in the closed position, and when the main valve spool is in the open position, fluid is permitted to flow from the second pressure chamber through the second pressure chamber outlet to the first pressure chamber and exit the main valve body through the outlet port.

3. The pulse valve assembly according to claim 2, wherein when fluid communication is permitted between the pilot valve inlet passage and the normally closed pilot valve outlet passage to move the main valve spool to the open position to permit fluid flow from the inlet ports to the outlet port, the main valve spool is moved in a direction toward the pilot valve to open second pressure chamber outlet.

4. The pulse valve assembly according to claim 2, wherein when the main valve spool is in the open position, fluid in the first pressure chamber that is received from the plurality of inlet ports and fluid received from the second pressure chamber outlet port is permitted to exit the outlet.

5. The pulse valve assembly according to claim 2, further comprising a spring positioned about the main valve spool that biases the main valve spool to the closed position.

6. The pulse valve assembly according to claim 1, wherein the pilot valve inlet passage communicates with the plurality of inlet ports.

7. The pulse valve assembly according to claim 1, wherein the normally open pilot valve outlet passage communicates with the second pressure chamber to maintain the main valve spool in the closed position.

8. The pulse valve assembly according to claim 7, wherein the normally open pilot valve outlet passage is in communication with a cavity formed in the main valve body, which communicates with the second pressure chamber via an aperture that separates the cavity and the second pressure chamber.

9. The pulse valve assembly according to claim 1, wherein the pilot valve includes a pilot valve body defining a pilot valve bore having a pilot valve member located therein, the pilot valve member being actuated by a solenoid that moves the pilot valve member between a first position where fluid communication between the pilot valve inlet passage and the normally open pilot valve outlet is permitted, and a second position where fluid communication between the pilot valve inlet passage and the normally closed pilot valve outlet is permitted.

* * * * *